(12) United States Patent
Fujinaka

(10) Patent No.: US 11,194,229 B2
(45) Date of Patent: Dec. 7, 2021

(54) LENS BARREL AND IMAGING DEVICE EQUIPPED WITH SAME

(71) Applicant: Panasonic Intellectual Property Management Co., Ltd., Osaka (JP)

(72) Inventor: Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 124 days.

(21) Appl. No.: 16/394,580

(22) Filed: Apr. 25, 2019

(65) Prior Publication Data

US 2019/0384142 A1     Dec. 19, 2019

(30) Foreign Application Priority Data

Jun. 13, 2018   (JP) .............................. JP2018-112689

(51) Int. Cl.
*G03B 17/14*      (2021.01)
*G02B 7/04*       (2021.01)

(52) U.S. Cl.
CPC .............. *G03B 17/14* (2013.01); *G02B 7/04* (2013.01)

(58) Field of Classification Search
CPC .. G03B 17/14; G03B 2205/0053; G03B 3/10; G03B 2205/00; G03B 2205/0007; G03B 2205/0015; G03B 2205/0046; G03B 2205/0061; G03B 2205/0069; G03B 2205/0076; G03B 2205/0084; G02B 7/04; G02B 7/102; G02B 7/09; G02B 7/10; G02B 7/105

USPC ......... 359/642, 811–816, 817, 818, 819–830
See application file for complete search history.

(56) References Cited

U.S. PATENT DOCUMENTS

| | | | | |
|---|---|---|---|---|
| 2002/0105732 A1* | 8/2002 | Yumiki | .................. | G02B 7/102 359/696 |
| 2008/0148892 A1* | 6/2008 | Sato | ....................... | G02B 7/102 74/422 |
| 2008/0170301 A1* | 7/2008 | Maeda | ..................... | G02B 7/00 359/823 |
| 2015/0200610 A1* | 7/2015 | Yamasaki | ................ | G02B 7/08 359/824 |

FOREIGN PATENT DOCUMENTS

| | | |
|---|---|---|
| JP | H11-160599 A | 6/1999 |
| JP | 2006-333571 A | 12/2006 |
| JP | 2009-047730 A | 3/2009 |
| JP | 2015-191123 A | 11/2015 |

* cited by examiner

*Primary Examiner* — Marin Pichler
*Assistant Examiner* — Alberto J Betancourt
(74) *Attorney, Agent, or Firm* — Renner, Otto, Boisselle & Sklar, LLP

(57) ABSTRACT

A lens barrel 10 comprises a holding frame 51, a guide pole 53 supported by the holding frame 51, a focus lens unit 52 that moves along the guide pole 53, a first actuator (a yoke 21, a coil 22, and a driving magnet 23) that relatively moves the focus lens unit 52 along the guide pole 53 with respect to the holding frame 51, and a second actuator (a gear 55 and a stepping motor 56) that rotationally drives the guide pole 53 around the axis.

7 Claims, 9 Drawing Sheets

LENS BARREL AND IMAGING DEVICE EQUIPPED WITH SAME

CROSS-REFERENCE TO RELATED APPLICATIONS

This application claims priority to Japanese Patent Application No. 2018-112689 filed on Jun. 13, 2018. The entire disclosure of Japanese Patent Application No. 2018-112689 is hereby incorporated herein by reference.

BACKGROUND

Technical Field

The present disclosure relates to a lens barrel and to an imaging device equipped with this lens barrel.

Description of the Related Art

A conventional lens barrel comprises a guide bar (guide pole) that supports a lens group movement frame (an example of a movable frame) movably in the optical axis direction, a lens group movement frame (an example of a movable frame) that holds a lens group, and a lens group barrel (an example of a holding frame) that holds the guide bar (see Patent Literature 1, for example).

CITATION LIST

Patent Literature

Patent Literature 1: JP-A 2015-191123

SUMMARY

In recent years the pixel count has been on the rise in imaging elements used in imaging devices. At the same time, the monitors use to view captured images are also increasing in resolution and screen size.

As the number of pixels of an imaging element is increased, or the resolution of a monitor for viewing an image is increased, focal shift that in the past was too small to notice becomes visible. Therefore, the lens used for focusing must be positioned at a finer pitch and with greater accuracy than in the past.

With the conventional lens barrel discussed above, even if an attempt is made to control the position of the lens at a fine pitch, there is a region where this cannot be completely accomplished due to friction between the guide pole and the lens frame, which means that there is a limit to how accurately the lens can be positioned.

The present disclosure provides a lens barrel with which there is less friction between the lens frame and the guide pole, and the lens frame can be positioned at a finer pitch and more accurately than in the past, as well as an imaging device equipped with this lens barrel.

The lens barrel according to the present disclosure comprises a holding frame, a shaft that is supported by the holding frame, a movable frame that moves along the shaft, a first actuator that relatively moves the movable frame along the shaft with respect to the holding frame, and a second actuator that rotationally drives the shaft around the axis of the shaft.

Effects

With the lens barrel disclosed herein, the lubrication state between the lens frame and the guide pole is changed, which reduces the friction between the lens frame and the guide pole and allows the lens frame to be positioned at a finer pitch and more accurately than in the past.

BRIEF DESCRIPTION OF DRAWINGS

Referring now to the attached drawings, which form a part of this original disclosure.

DETAILED DESCRIPTION OF THE EMBODIMENT

Embodiments will now be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventors have provided the appended drawings and the following description so that a person skilled in the art might fully understand this disclosure, but do not intend for these to limit what is discussed in the patent claims.

In addition, text referring to "substantially XX," such as "substantially the same," encompasses the meaning not only of being exactly the same, but also of being the same for practical purposes. The same applies to text referring to "about XX" or "approximately XX."

It is to be noted that the drawings do not necessarily give a precise depiction. Also, components in the various drawings that are substantially the same will be numbered the same, and redundant description will be omitted or simplified.

Embodiment 1

The configuration of the imaging device 1 comprising the lens barrel 10 according to Embodiment 1 will now be described with reference to FIGS. 1 to 7.

Figure 1:
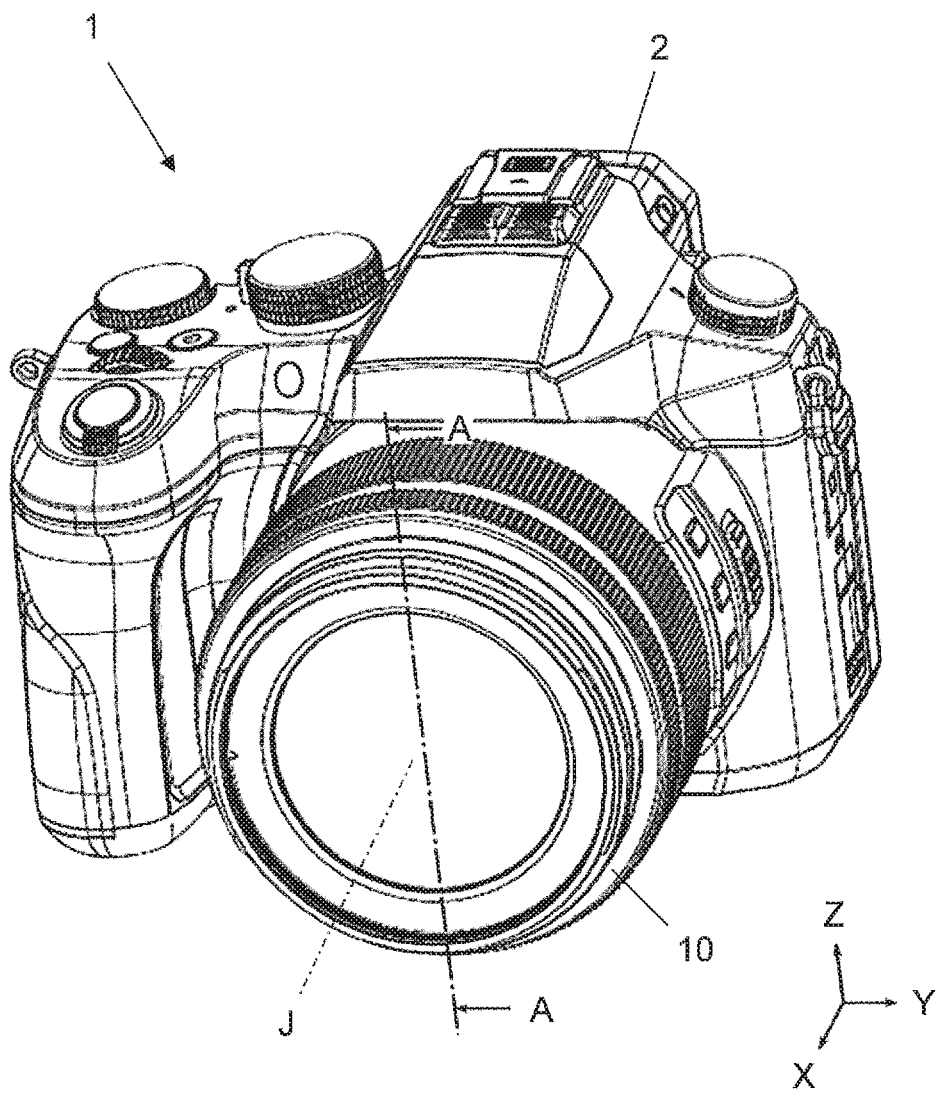
FIG. 1 is an oblique view of the imaging device according to Embodiment 1.
Figure 2:
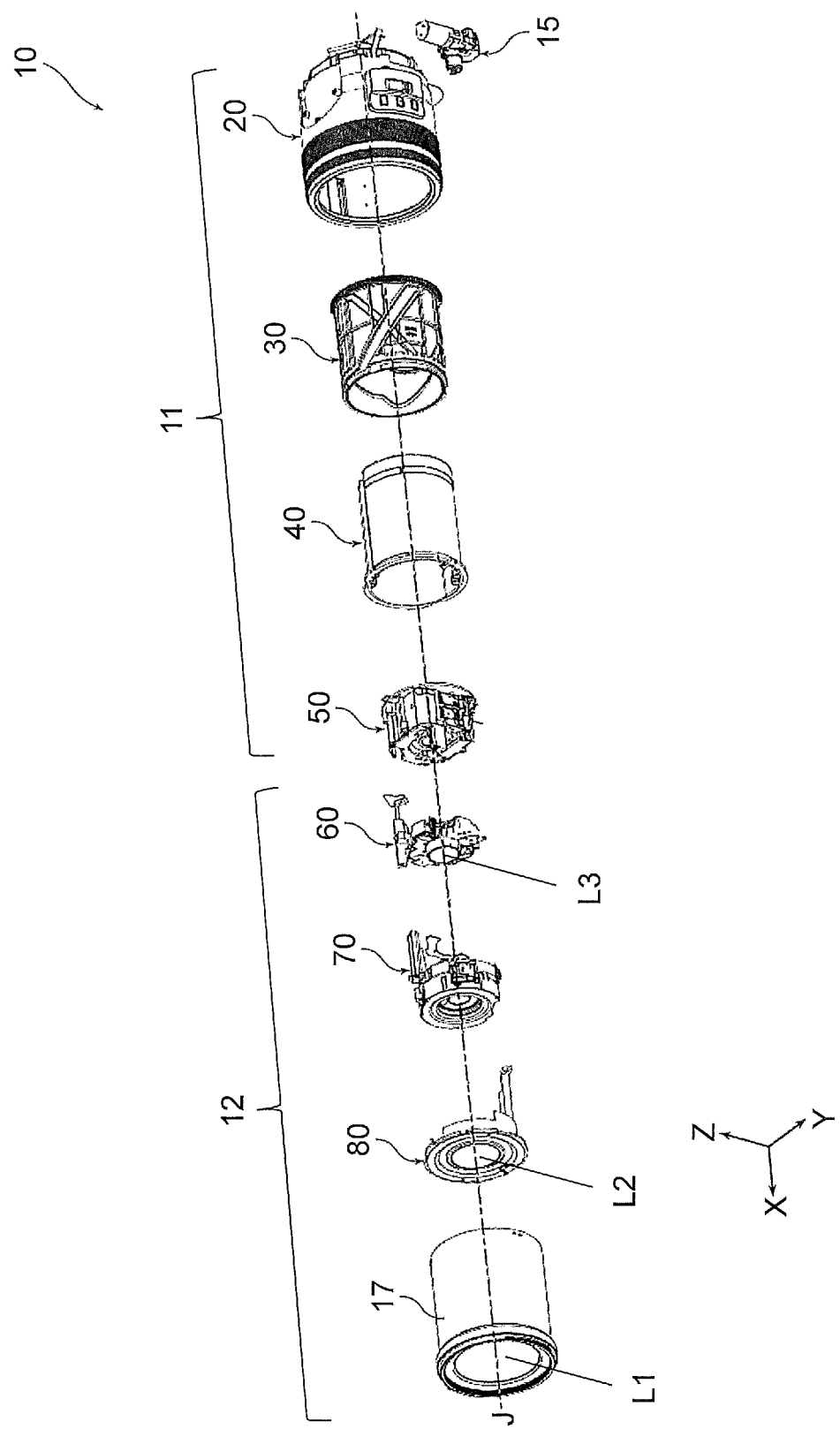
FIG. 2 is an exploded oblique view of the lens barrel in the imaging device according to Embodiment 1.
Figure 3:
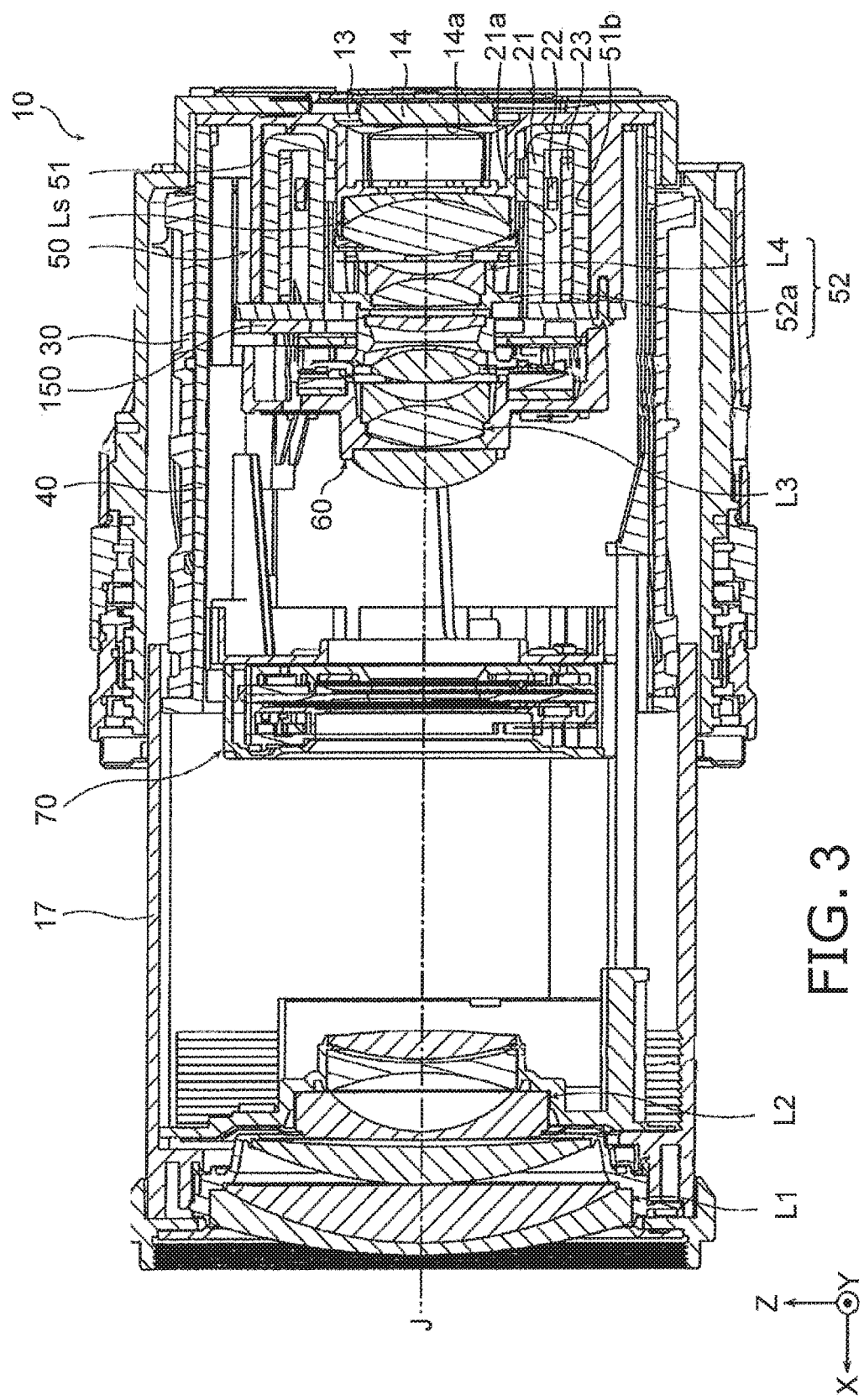
FIG. 3 is a cross section of the lens barrel according to Embodiment 1 along A-A line in FIG. 1.
Figure 4:
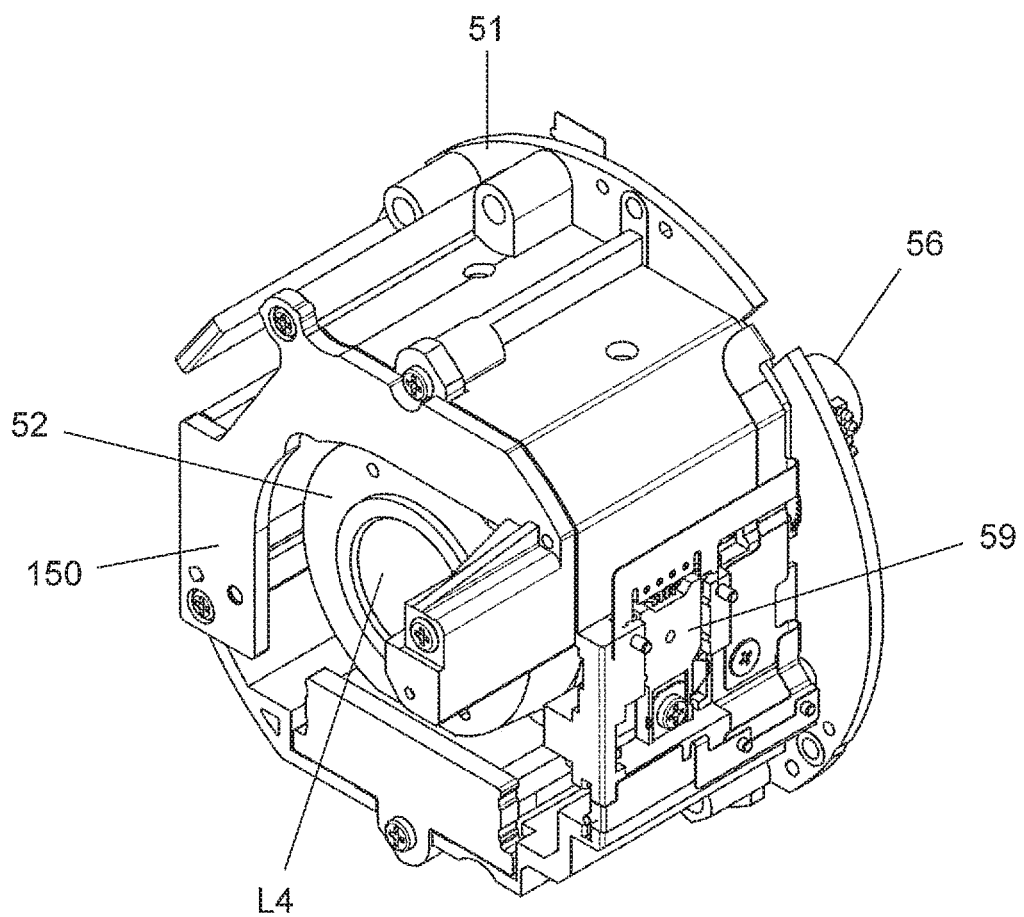
FIG. 4 is an oblique view of the focus unit of the lens barrel according to Embodiment 1.
Figure 5:
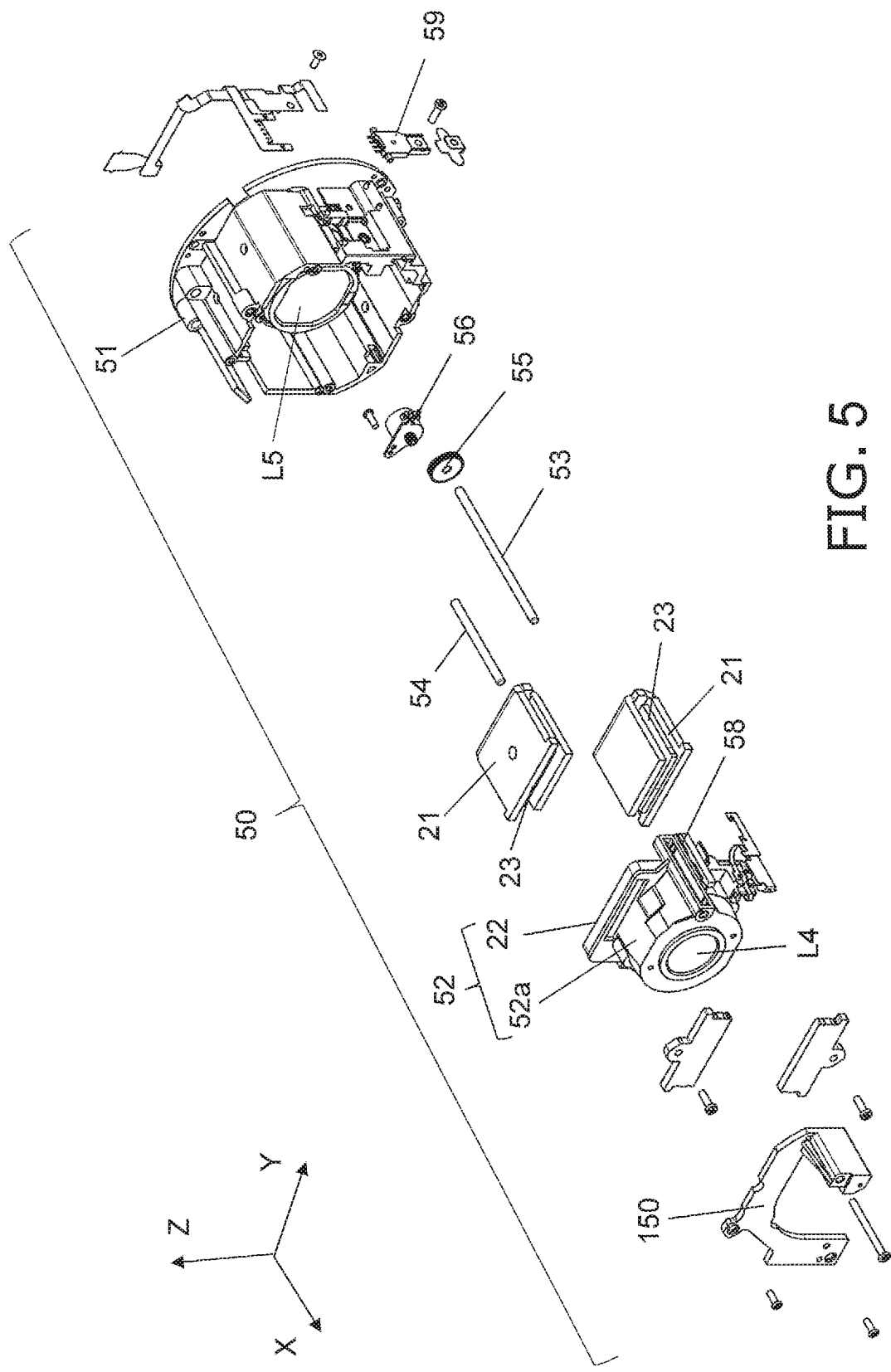
FIG. 5 is an exploded oblique view of the focus unit according to Embodiment 1.

FIG. 1 is an oblique view of an imaging device 1 according to Embodiment 1. FIG. 2 is an exploded oblique view of a lens barrel 10 of the imaging device 1 according to Embodiment 1. FIG. 3 is a cross section of the lens barrel 10 according to Embodiment 1 along A-A line in FIG. 1. FIG. 4 is an oblique view of a focus unit 50 of the lens barrel according to Embodiment 1. FIG. 5 is an exploded oblique view of the focus unit 50 according to Embodiment 1. FIG.

Figure 7:
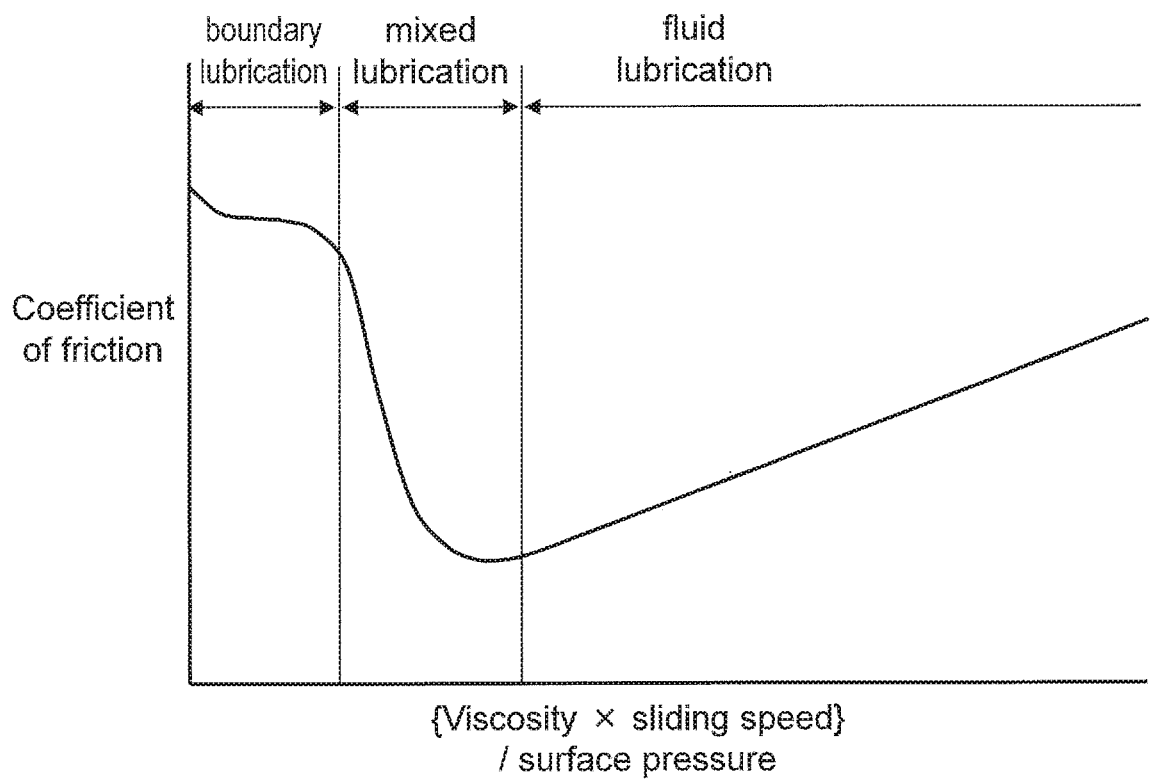
FIG. 7 is a Stribeck diagram.

6 is a diagram of the configuration of a focus lens unit (movable frame) 52 and a guide pole (shaft) 53. FIG. 7 is a Stribeck diagram.

In FIG. 1, a direction parallel to the optical axis J of the imaging device 1 is defined as the X axis direction, the horizontal direction is defined as the Y axis direction, and the vertical upper side is defined as the Z axis direction. The object side is defined as the X axis positive direction side, and the imaging element 14 side is defined as the X axis negative direction side. In FIG. 1, since the Y axis direction and the Z axis direction change with the usage mode, this is not the only possibility. The same applies to the drawings after FIG. 1.

As shown in FIG. 1, the imaging device 1 is a digital still camera, for example. The imaging device 1 comprises an imaging device main body (main body part) 2 and the lens barrel 10.

The imaging device main body 2 has an image processor, a system controller, a memory unit, a camera display unit, a camera operation unit, and the like.

As shown in FIGS. 1 and 3, the image processor converts a signal from an imaging element 14 (discussed below) into an image signal. The system controller controls shooting operation, recording, and so forth for the entire imaging device 1. The memory unit includes a main memory of the imaging device main body 2 and a storage medium that is mounted from the outside. The camera display unit performs aiming at the subject during image capture, confirmation of setting changes, and preview confirmation of the captured image. The camera operation unit is used for shooting operations and setting changes.

As shown in FIGS. 1 and 2, the lens barrel 10 has a zoom mechanism. When no image is being captured, the lens barrel 10 protrudes in the X axis positive direction from the imaging device main body 2. Then, during shooting and operation of the zoom mechanism, the lens barrel 10 is deployed in the X axis positive direction. The lens barrel 10 may be detachable from the imaging device main body 2. The lens barrel 10 comprises a stationary portion 11 and a moving portion 12.

As shown in FIGS. 1 and 3, one end of the stationary portion 11 (the X axis negative direction side) is fixed to the imaging device main body 2. A cam barrel 30, a rectilinear frame 40, and the focus unit 50 are housed in the stationary portion 11. A holding base 13 formed on the bottom of the stationary portion 11 holds an imaging element 14. The imaging element 14 is an element that picks up an image via first to fifth lens groups L1 to L5, and is a CMOS image sensor, for example. The imaging element 14 subjects light from the subject to photoelectric conversion, and outputs a signal to the image processor. The holding base 13 of the imaging device main body 2 holds the imaging element 14. The holding base 13 is formed substantially in a disk shape, and holds the imaging element 14 in a state in which the imaging face 14a of the imaging element 14 is perpendicular to the optical axis J.

As shown in FIGS. 2 and 3, the cam barrel 30 is disposed inside the exterior unit 20 included in the stationary portion 11 and rotates around the optical axis J. The stationary portion 11 has, for example, an actuator 15 in which a gear component and a DC motor are integrated. The rotation of the DC motor transmits the rotation of the DC motor to the rotation of the cam barrel 30 via the gear component, which meshes with an output gear of the DC motor.

A plurality of cam grooves are formed on the inner face side and the outer peripheral side of the cam barrel 30. In addition, a driven gear component that meshes with the gear component of the actuator is provided along the circumferential direction to the end of the cam frame on the X axis negative direction side of the outer peripheral face.

The rectilinear frame 40 is formed in a cylindrical shape and is disposed on the inside of the cam barrel 30. The rectilinear frame 40 is provided with a plurality of rectilinear grooves and guide shafts. The rectilinear grooves and the guide shafts support a first lens group unit 17, a second lens group unit 80, a shutter unit 70, and a third lens group unit 60 movably in the optical axis direction.

The first lens group unit 17, the second lens group unit 80, the shutter unit 70, and the third lens group unit 60 are each provided with cam pins that engage with the plurality of cam grooves provided to the cam barrel 30. The cam grooves in the cam barrel 30 constitute a cam mechanism for moving the rectilinear frame 40 rectilinearly according to the rotation.

As a result, when the DC motor is rotated, the positions of the first lens group unit 17, the second lens group unit 80, the shutter unit 70, and the third lens group unit 60 in the optical axis direction change to perform zooming.

As shown in FIGS. 4 and 5, the focus unit 50 has a holding frame 51, a lens group L5, a focus lens unit 52, a guide pole 53, an auxiliary guide pole 54, and a guide cover 150.

The holding frame (support frame) 51 is, for example, a plastic member formed in a substantially cylindrical shape, and opens toward the X axis positive direction side. The holding frame 51 holds the fifth lens group L5 in its interior. The fifth lens group L5 is positioned by the holding frame 51. The fifth lens group L5 is disposed so that the optical axis of the fifth lens group L5 substantially coincides with the optical axis J of the imaging element 14. The fifth lens group L5 is provided more to the X axis positive direction side than the imaging element 14, and so as to face the imaging face 14a of the imaging element 14.

As shown in FIG. 5, inside the holding frame 51 is formed an accommodation space 51b for accommodating a driving mechanism (first actuator) constituted by a magnetic circuit having a yoke 21, a coil 22, and a driving magnet 23.

That is, with the lens barrel 10 in this embodiment, a driving mechanism composed of a magnetic circuit having the yoke 21, the coil 22, and the driving magnet 23 constitutes a first actuator that moves the focus lens unit 52 back and forth along the guide pole 53.

The yoke 21 is substantially U-shaped in cross section, and is disposed so as to follow the inner peripheral face of the holding frame 51. The yoke 21 has a length substantially equal to the thickness of the holding frame 51 in the X axis direction. An accommodation space 21a that is recessed in the X axis negative direction from the end face on the X axis positive direction side of the yoke 21 is formed in the yoke 21.

The coil 22 is provided to a focus lens frame 52a and is disposed in the accommodation space 21a of the yoke 21. Electric power from a power supply unit is supplied to the coil 22. The supply of power may be transmitted via flexible wiring.

The driving magnet 23 is provided on the outer peripheral side of the coil 22 so as to follow the inner peripheral face of the yoke 21. The face on the inner peripheral side of the driving magnet 23 is an N pole, and the face on the outer peripheral side of the driving magnet 23 is an S pole. Here, the driving magnet 23 is disposed so as to generate a magnetic flux in a direction perpendicular to the direction in which the coil 22 is energized. Consequently, the coil 22 is subjected to a Lorentz force that acts in the X axis direction. As a result, the focus lens unit 52 can be moved along the X axis direction.

With this embodiment, the magnet 58 is used as an example of a position sensing member, but the position sensing member may instead be a reflecting mirror, for example.

As shown in FIGS. 4 and 5, the focus lens unit 52 is movable in the X axis direction. The focus lens unit 52 has the focus lens frame 52a, a lens group L2, and a magnet 58 (an example of a position sensing member). Also, the holding frame 51 has an MR (magneto resistive) element 59 (an example of a position sensor). The focus lens frame 52a is formed in a substantially cylindrical shape and holds in its interior a focus lens group L4, more to the X axis positive direction side than the holding frame 51. The focus lens group L4 is provided opposite a fifth lens group L5, more to the X axis positive direction side than the fifth lens group L5, so that the optical axis of the focus lens group L4 substantially coincides with the optical axis J of the imaging element. A pole insertion hole 52c into which the guide pole 53 is inserted is formed in the focus lens frame 52a. Also, an auxiliary guide pole 54 is fixed to the holding frame 51 so that the focus lens unit 52 moves rectilinearly in the X axis direction. In this embodiment, the MR element 59 is used as an example of a position sensor, but a Hall element may be used as an example of a position sensor instead of the MR element 59.

As shown in FIG. 5, the MR magnet 58 is provided to the focus lens frame 52a near the MR element 59. When the focus lens frame 52a provided with the MR magnet 58 moves, a change in the magnetic field generated by the MR magnet 58 is detected by the MR element 59.

The MR element 59 is a sensor for sensing the position of the focus lens unit 52, and is provided to the holding frame 51. When the MR magnet 58 moves the focus lens unit 52 during imaging, for example, the position of the MR magnet 58 with respect to the MR element 59 changes. At this point, the magnetic flux changes at the position of the MR element 59, and the output of the MR element 59 also changes. Thus, if the output of the MR element 59 is sensed, the shift position of the focus lens unit 52 can be sensed. A magnetic type of MR element 59 or a Hall element may be used as the position sensor, or a reflection type of photo interrupter may be used. The supply of power may be transmitted via flexible wiring.

As shown in FIG. 4, the guide pole 53 and the auxiliary guide pole 54 are, for example, cylindrical metal members, and extend substantially parallel to the X axis direction. The guide pole 53 and the auxiliary guide pole 54 support the focus lens frame 52a movably in the X axis direction. In other words, the guide pole 53 and the auxiliary guide pole 54 guide the focus lens unit 52 so as to move along the optical axis J. One end side (the X axis negative direction side) of the guide pole 53 and the auxiliary guide pole 54 is held by the holding frame 51 of the focus unit 50, and the other end side (the X axis positive direction side) of the guide pole 53 and the auxiliary guide pole 54 is held by the guide cover 150.

The guide cover 150 is a cover member made of plastic, and is provided at the end of the focus unit 50 on the X axis positive direction side. More specifically, the guide cover 150 is fixed (held) at the end of the holding frame 51 on the X axis positive direction side (subject side).

Figure 6:
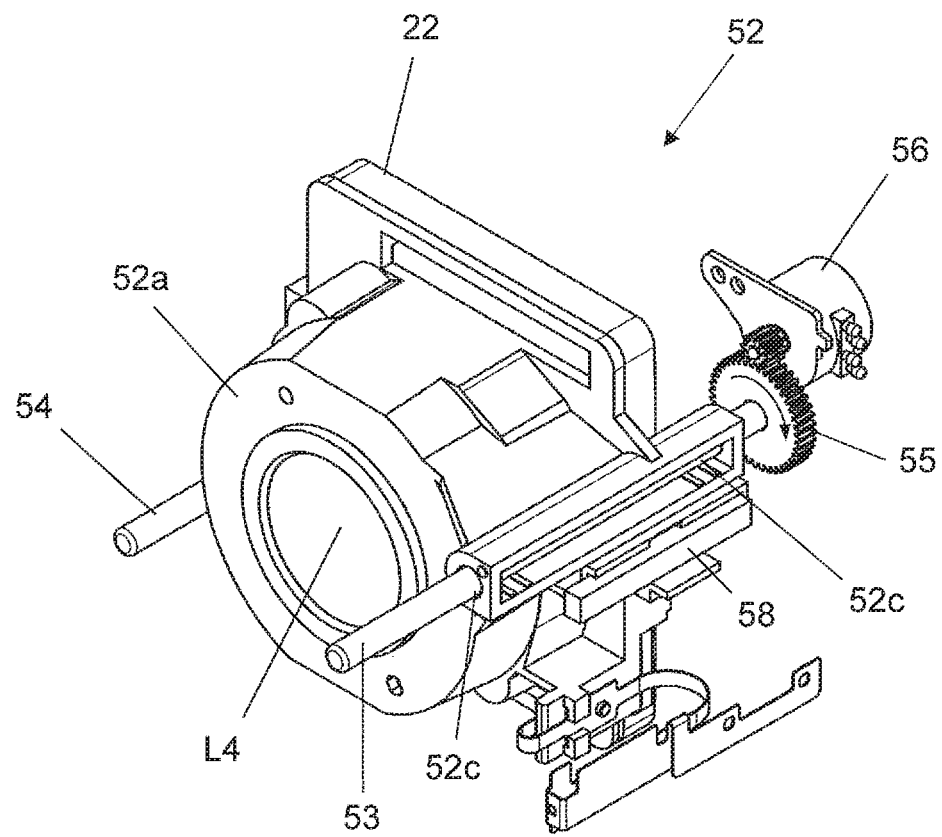
FIG. 6 is a diagram of the configuration of the focus lens unit and the guide pole according to Embodiment 1.

FIG. 6 is similar to FIG. 4, but in which the portion pertaining to the main characteristic parts of this embodiment have been removed.

In FIG. 6, the focus lens unit (movable frame) 52 is supported by the guide pole (shaft) 53 and the auxiliary guide pole 54. The guide pole 53 is inserted into the pole insertion hole 52c of the focus lens unit 52 and restricts the inclination of the focus lens unit 52 with respect to the optical axis. The auxiliary guide pole 54 restricts the rotation of the focus lens unit 52 around the optical axis. As a result, the focus lens unit 52 moves only in the optical axis direction, while maintaining its orientation relative to the optical axis.

Grease is applied to the guide pole 53 and the pole insertion hole 52c of the focus lens unit 52. This grease has the effect of reducing the friction generated between the guide pole 53 and the pole insertion hole 52c.

Also, in FIG. 6, a gear (second actuator) 55 is press-fitted and fixed to the guide pole 53. The gear 55 is rotationally driven in the direction of the arrow in the drawing by a stepping motor 56 (second actuator).

That is, with the lens barrel 10 in this embodiment, the second actuator is constituted by the gear 55 fixed to the end of the guide pole 53, and the stepping motor 56 that rotationally drives the gear 55.

As a result, when the guide pole 53 is rotated by the second actuator (the gear 55 and the stepping motor 56), no force is generated in the direction in which the focus lens unit 52 is moved, but there is an action that further reduces the friction occurring between the guide pole 53 and the pole insertion hole 52c.

In this embodiment a configuration is described in which grease 64 is injected into the pole insertion hole 52c of the focus lens unit 52 and the guide pole 53, but it should go without saying that the same effect can be achieved by injecting some other fluid such as an oil or a magnetic fluid.

The principle by which the friction is further reduced will now be described in detail.

FIG. 7 is a Stribeck diagram. The Stribeck diagram was developed by the German researcher Prof. Stribeck to derive the relationship of the coefficient of friction as a function of load, sliding speed, and lubricating oil viscosity with respect to bearing friction, and is frequently used to explain the lubrication state between two surfaces that are in relative motion.

In a Stribeck diagram, when the load and the lubricating oil viscosity are kept constant, in a state in which the sliding speed is low, the result is boundary lubrication in which the two surfaces slide while in contact, and the coefficient of friction is generally high in this state. As the sliding speed increases, the state changes to that of fluid lubrication in which a lubricant is always present in between the two surfaces, and the coefficient of friction and the sliding velocity are approximately proportional.

An intermediate region between boundary lubrication and fluid lubrication is called mixed lubrication, in which a boundary lubrication portion and a fluid lubrication portion coexist between the two surfaces.

The coefficient of friction generally exhibits its lowest value in the state in which the sliding speed is slightly lower than the sliding speed in fluid lubrication in the mixed lubrication region.

In FIG. 6, when positioning at a fine pitch without rotating the guide pole 53, the lubrication state between the guide pole 53 and the pole insertion hole 52c of the focus lens unit 52 is a boundary lubrication state, in which the coefficient of friction is high.

On the other hand, when the guide pole 53 is rotated, the lubrication state between the guide pole 53 and the focus lens unit 52 can be controlled in advance even when the focus lens unit 52 is not moving.

For example, if the rotation speed of the guide pole 53 is controlled so that the lubrication state between the guide pole 53 and the pole insertion hole 52c of the focus lens unit 52 is mixed lubrication, the coefficient of friction can be greatly reduced, to between roughly one severalth and roughly a few percent that with boundary lubrication.

In ordinary position control, drive is performed with a driving force corresponding to the position error, so positioning is impossible below a position error where the frictional force and the driving force are in equilibrium.

On the other hand, when the guide pole 53 is rotated, friction is greatly reduced between the guide pole 53 and the pole insertion hole 52c of the focus lens unit 52, so positioning at a fine pitch, which was impossible in the past, becomes possible.

Thus, rotating the guide pole 53 makes it possible to control the lubrication state between the guide pole 53 and the pole insertion hole 52c of the focus lens unit 52, and to perform positioning at a fine pitch that was impossible up to now.

In particular, when moving images are captured by a camera to which the lens barrel 10 of this embodiment has been mounted, periodic vibration (wobbling) that moves the focus lens unit 52 is sometimes imparted back and forth in the optical axis direction at a tiny amplitude is sometimes imparted in order to move the focus lens unit 52 to the desired position at a fine pitch.

At this point, as in this embodiment, conformance with the wobbling can be improved by rotating the guide pole 53 and thereby reducing the friction between the guide pole 53 and the pole insertion hole 52c of the focus lens unit 52.

In the above description, the goal was to lower the coefficient of friction, but if the goal is to stop the focus lens unit 52 quickly, it is of course also possible to perform control such as conversely stopping the rotation of the guide pole 53 to increase the friction.

Embodiment 2

Next, the configuration of the lens barrel according to Embodiment 2 will be described with reference to FIG. 8.

Figure 8:
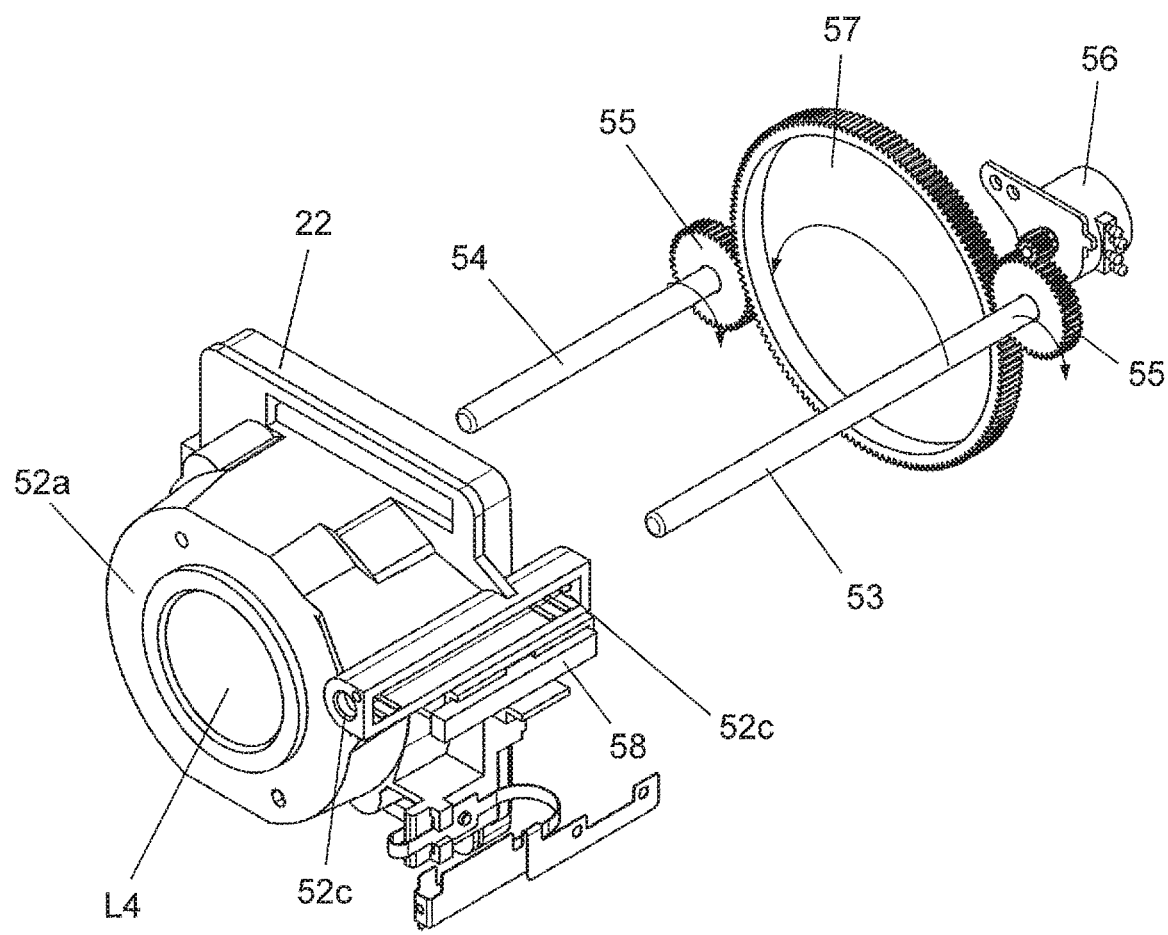
FIG. 8 is a diagram of the configuration of the focus lens unit, the guide pole, and an auxiliary guide pole according to Embodiment 2.

FIG. 8 is diagram illustrating the relation between the focus lens unit 52, the guide pole (shaft) 53, and the auxiliary guide pole (shaft) 54.

In FIG. 8, the gear 55 is press-fitted and fixed to the guide pole 53, and the gear 55 is rotationally driven by the stepping motor 56, which is the same as in Embodiment 1.

In the second embodiment the difference is that a gear 55 is also press-fitted and fixed to the auxiliary guide pole 54, and the gears are linked by a ring-shaped large gear 57. The center portion of the large gear 57 is open so as not to block the light beam that has passed through the focus lens group L4.

In this embodiment, when the stepping motor 56 is rotationally driven, both the guide pole 53 and the auxiliary guide pole 54 are rotationally driven, and not only the friction generated between the guide pole 53 and the pole insertion hole 52c of the focus lens unit 52, but also the friction generated between the auxiliary guide pole 54 and the auxiliary guide portion 52d of the focus lens unit 52 is reduced.

Figure 9:
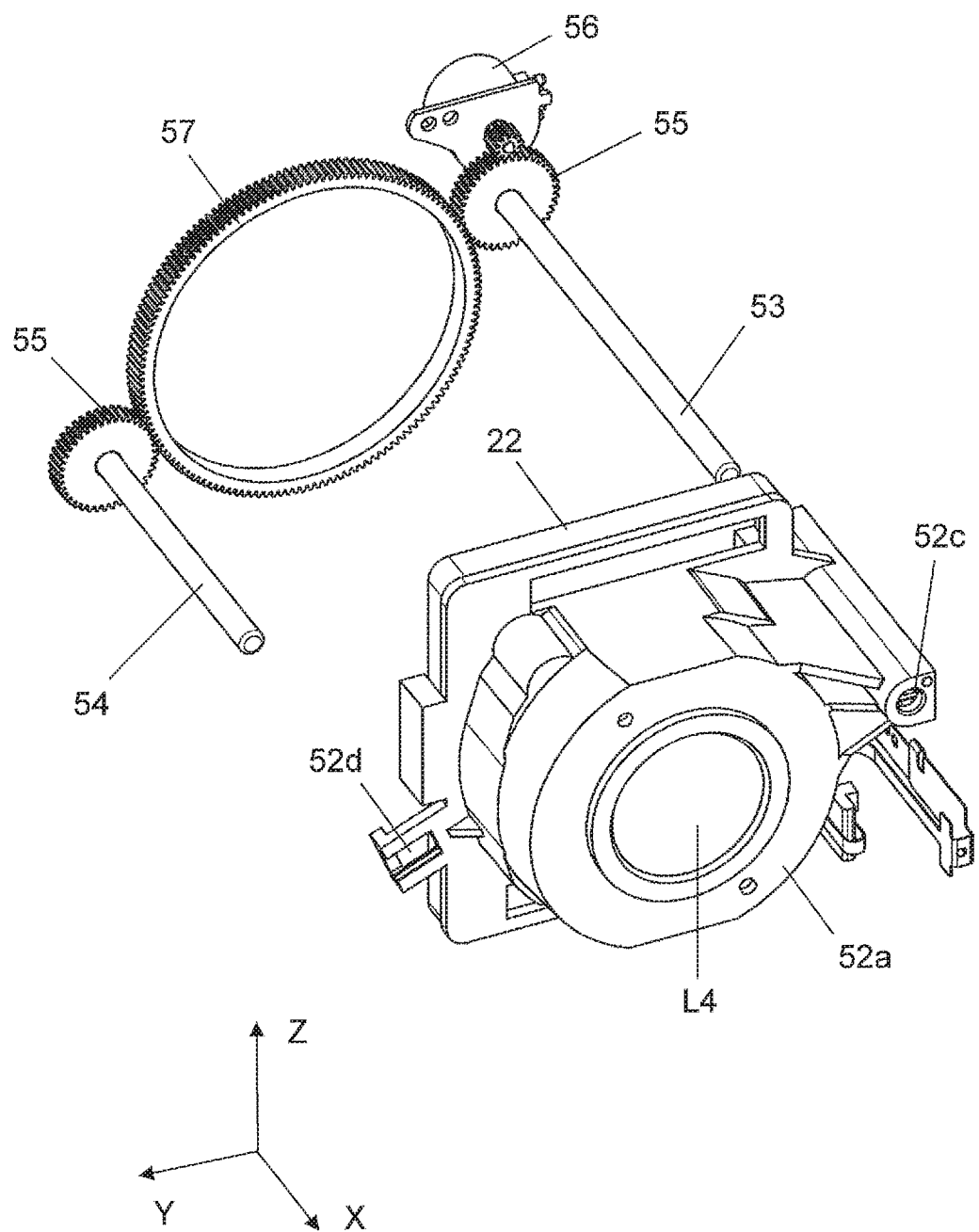
FIG. 9 is a diagram of the configuration of the focus lens unit, the guide pole, and the auxiliary guide pole in FIG. 8.

As shown in FIG. 9, the auxiliary guide portion 52d is disposed at a position substantially opposite the guide pole 53 with respect to the optical axis, and its inside is formed in a rectangular shape. Therefore, the rotation of the focus lens unit 52 around the axis of the guide pole 53 can be restricted. Also, since the inside of the auxiliary guide portion 52d is formed in a rectangular shape, the sliding surface area with the auxiliary guide pole 54 is smaller than the sliding surface area between the pole through hole 52c and the guide pole 53, and there is less friction. Therefore, there is little friction reduction effect when the auxiliary guide pole 54 alone is rotated, but if the guide pole 53 and the auxiliary guide pole 54 are both rotated, friction can be reduced more than when only the guide pole 53 is rotationally driven.

Although this does make the configuration somewhat more complicated, it allows positioning at a finer pitch as compared with Embodiment 1.

With the configuration shown in FIGS. 8 and 9, in order to simplify the configuration, an example is given in which the two gears 55 are rotationally driven via the large gear 57 by a single stepping motor 56, but the present disclosure is not limited to this.

For example, separate gears and stepping motors respectively linked to the gear 55 on the guide pole 53 side and the gear 55 on the auxiliary guide pole 54 side may be provided.

Modification of Embodiment

In Embodiments 1 and 2 above, the gear or gears 55 were used to rotationally drive the guide pole 53, but it should go without saying that it is also possible to adopt a configuration in which the shaft of the stepping motor 56 itself serves as the guide pole 53, a configuration in which a pulley or another such power transmission mechanism is used to rotationally drive the guide pole 53, or the like.

In Embodiments 1 and 2 above, one or two guide poles were rotationally driven by a single stepping motor. When the present disclosure is applied to a configuration in which two focus lens units move along the optical axis during focusing (so-called double focus), or a configuration in which three or more focus lens units move along the optical axis during focusing, it should go without saying that friction in the plurality of focus lens units can be reduced by rotationally driving three or more guide poles.

As described above, embodiments and modifications of embodiments have been described as examples of the technology in the present disclosure. To that end, the accompanying drawings and detailed description are provided.

Therefore, the constituent elements shown in the accompanying drawings and described in the detailed description can include not only constituent elements that are essential for solving the problem, but also constituent elements that are not essential for solving the problem. As such, one should not be jump to the conclusion that these non-essential constituent elements are essential just because non-essential constituent elements are shown in the accompanying drawings and described in the detailed description.

Also, the above embodiments were given to illustrate examples of the technology disclosed herein, so various modifications, substitutions, additions, omissions, and so forth can be made within the scope of the patent claims or equivalents thereof.

INDUSTRIAL APPLICABILITY

The lens barrel of the present disclosure can be broadly applied to imaging devices that capture an image of a subject.

General Interpretation of Terms

In understanding the scope of the present invention, the term "configured" as used herein to describe a component, section, or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The invention claimed is:

1. A lens barrel, comprising:
   a holding frame;
   a shaft that is supported by the holding frame;
   a movable frame configured to move along the shaft;
   a first actuator configured to relatively move the movable frame along the shaft with respect to the holding frame; and
   a second actuator configured to rotationally drive the shaft around an axis of the shaft without generating a force in a direction in which the movable frame moves, wherein the shaft is rotationally driven around the axis of the shaft to reduce friction generated between the movable frame and the shaft.

2. The lens barrel according to claim 1, further comprising a controller configured to control the second actuator so as to change a rotation speed according to a movement state of the movable frame.

3. The lens barrel according to claim 1, wherein the second actuator rotates a plurality of shafts.

4. The lens barrel according to claim 1, wherein the movable frame has an insertion hole into which the shaft is inserted.

5. The lens barrel according to claim 4, wherein a fluid is provided between the insertion hole of the movable frame and the shaft.

6. An imaging device, comprising:
   the lens barrel according to claim 1; and
   a main body part on which the lens barrel is mounted.

7. The lens barrel according to claim 2, wherein the controller is configured to control the second actuator so as to control the second actuator to control friction between the movable frame and the shaft.

* * * * *